S. WIGELIUS.
GAS MOTOR.
APPLICATION FILED APR. 26, 1910.
1,135,418.
Patented Apr. 13, 1915.
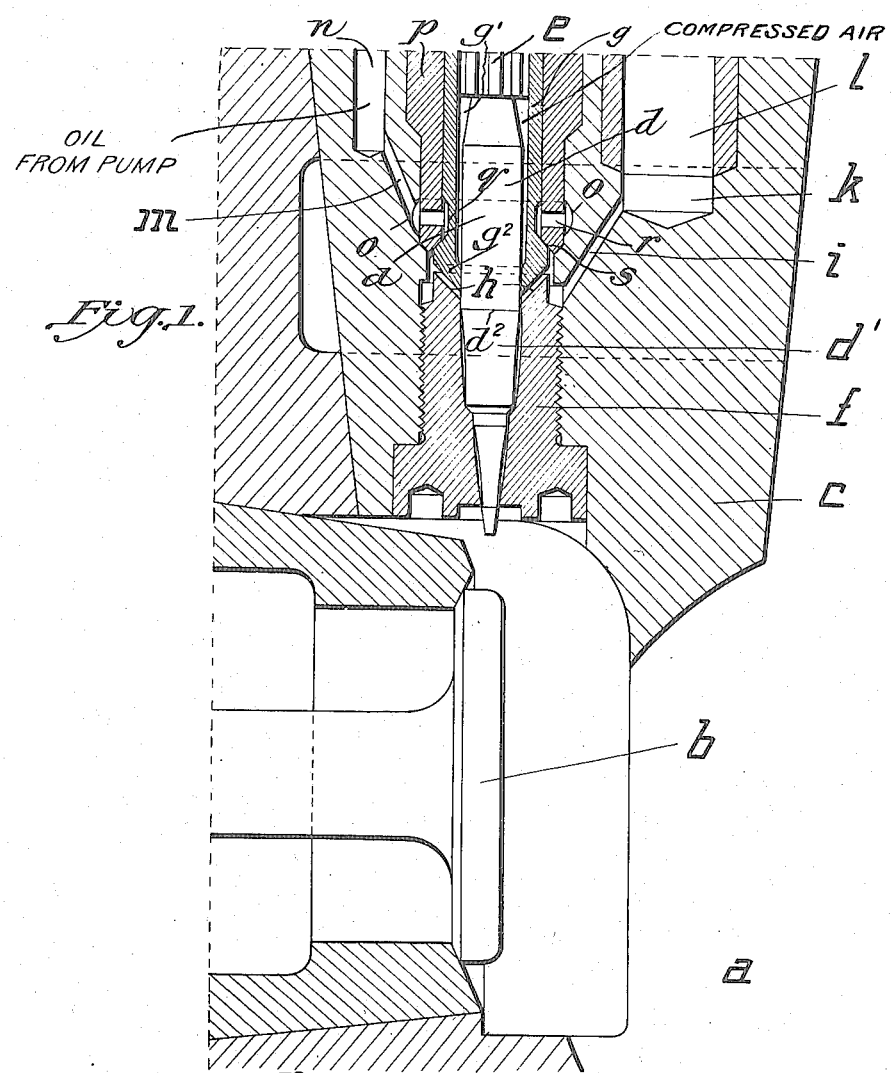
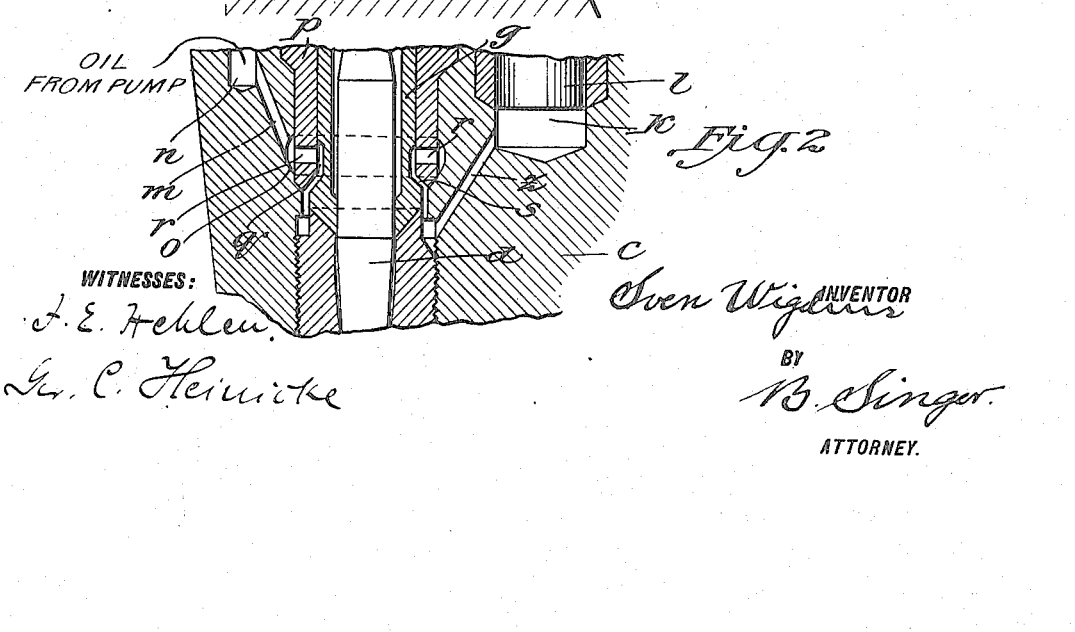
WITNESSES:
INVENTOR
Sven Wigelius
BY B. Singer
ATTORNEY.

UNITED STATES PATENT OFFICE.

SVEN WIGELIUS, OF STOCKHOLM, SWEDEN, ASSIGNOR TO AKTIEBOLAGET WIGELIUS MOTORER, OF STOCKHOLM, SWEDEN.

GAS-MOTOR.

1,135,418.  Specification of Letters Patent.  Patented Apr. 13, 1915.

Application filed April 26, 1910. Serial No. 557,780.

*To all whom it may concern:*

Be it known that I, SVEN WIGELIUS, engineer, a subject of the King of Sweden, and a citizen of Sweden, residing at Kaptensgatan 17, Stockholm, Sweden, have invented new and useful Improvements in Gas-Motors, of which the following is a specification.

My invention relates to improvements in devices for injecting liquid fuel into the cylinder of an internal combustion engine under pressure wherein the fuel is supplied into the spraying device by means of an auxiliary pump.

According to my present invention a movable sleeve surrounds an air controlling spindle or admission valve, said sleeve controlling the passage of the fuel to and from a main engine pump.

In the accompanying drawings; Figure 1 is a longitudinal section of a portion of an engine cylinder equipped in accordance with this invention. Fig. 2 is a similar section showing certain of the parts in the different positions.

$a$ indicates the motor cylinder, $b$ the exhaust valve and $c$ a plug, which is removably inserted into the cylinder and in which the inlet valve device is mounted. This latter consists of a reciprocating regulating spindle $d$, provided with a guide $e$, and which is surrounded by a sleeve $g$. The interior of the sleeve $g$ is larger than the spindle $d$, except at $g^2$ at which point it fits the spindle closely. The spindle $d$ is reduced at $d'$, forming a shoulder or closure portion $d^2$. A plug $f$ surrounds the lower end of the regulating spindle.

The lower end of the sleeve $g$ and the facing ends of the sleeve $g$ and plug $f$ are formed as a valve and valve seat, respectively, and when the sleeve $g$ is lifted an annular space or passage $h$ is formed between said plug $f$ and sleeve $g$. The passage $h$ communicates by means of a channel $i$ with an oil chamber $k$, formed between the piston $l$ of the auxiliary pump, and the wall of the plug $c$.

The main engine fuel pump, not shown, forces the fuel into the pressure conduit $n$, which communicates through a passage $m$ with a ring-shaped chamber $o$ formed in the plug $c$ on the outer side of the sleeve $p$ plug $c$ which is inserted in the said plug $c$ and surrounds the aforementioned sleeve $g$.

Another ring-shaped chamber $q$ is formed inside the sleeve $p$ in the material of the sleeve $g$ and the ring-shaped chambers $o$ and $q$ communicate with each other through holes $r$ bored in the sleeve $p$.

In the position shown on the drawing, the sleeve $g$ is lifted up from the plug $f$, so that a space is formed between the sleeve $g$ and the plug $f$, whereas the communication between the chamber $q$ and the channel $i$ is closed, the sleeves $p$ and $g$ abutting tightly against each other at $s$.

In this position of the parts no fuel can be forced in from the engine pump to the fuel chamber $k$. On the other hand if the fuel chamber $k$ contains fuel from a previous stroke, this fuel can be forced in through the channel $i$ and the space $h$ to the annular space between the spindle $d$ and the plug $f$ by the downward stroke of the auxiliary piston $l$. In the position shown on the drawing, there is no space between spindle $d$ and plug $f$, but if the spindle is lifted by means of a cam, or the like (not shown) the space $h$ will communicate with the annular space formed between the plug $f$ and the reduced middle part $d'$ of the spindle $d$ and the fuel thus enters the said annular space and hence is sprayed into the cylinder. If on the other hand the sleeve $g$ is moved downwardly, by means of a cam or the like, until its lower part abuts against the upper part of the plug $f$, the space $h$ will be closed and a space formed at $s$ between the fixed sleeve $p$ and the movable sleeve $g$. In this position of the parts the fuel having been pressed into the chamber $q$, by means of the main engine fuel pump, will pass through the annular space between the plug $c$ and the sleeve $g$ and further through the channel $i$ to the oil chamber $k$ and fill the same with fuel for the next stroke. The downward movement of the auxiliary pump piston $l$, the sleeve $g$ and the spindle $d$ is hereby thus regulated in the known manner by means of cams or the like so that when the piston $l$ moves downwardly the communication to the channel $m$ is closed, the different parts occupying the position shown on the drawing.

In the operation of this engine it is to be noted that definite quantities or charges of oil are introduced which are free from air. The purpose of the second or auxiliary pump $l$ will be understood from the description of the operation.

In order to understand the operation let it be supposed that Fig. 1 shows the position of the different parts immediately after the introduction of a charge and its explosion. At this time the valve $d$ will have been closed while the valve $g$ is still raised. Now, as the engine operates the valve $g$ closes on the seat $h$. At the same time the main pump piston is on its forward stroke so that oil is forced through the conduit $n$. The piston of the pump $l$ at this time is raised. Oil therefore passes through the port $m$, the parts assuming the position shown in Fig. 2. This oil flows up into the cylinder $k$ through the passage $z$. It is to be particularly noted that no air enters with the oil at this time. After the cylinder $k$ has been charged with oil the operating cams cause the lifting of the valve $g$ off its seat $h$ so as to close off the port $m$ and prevent oil flowing back into the main pump. At the proper time for introducing the charge of oil the valve $d$ is raised by a suitable cam and opens a passage between the cylinder $k$ and the interior of the engine cylinder $a$. The piston of the pump $l$ is at this time moving downward and the oil is forced through the passage between the members $f$ and $g$ and around the valve $d$. The parts are so timed that when the valve $d$ lifts the oil first starts toward the interior of the cylinder $a$ and then the valve $d$ lifts sufficiently to permit air to flow into the cylinder $a$ with the oil, and air pass around said valve $d$. All the time the air is flowing in, the piston of the pump $l$ is descending so that no air can pass into the cylinder $k$. When the charge has been nearly introduced the valve $d$ moves downward and first closes off the air. The piston of the pump $l$ continues its downward movement until this air is closed off. When the air has been completely closed off, the piston of the pump $l$ starts to rise and slightly before this rising movement the valve $d$ is seated in its lowermost position and valve $g$ again assuming the position shown in Fig. 2 just at the instant of reversal of movement of the piston in $l$. Furthermore the reason why two pumps are used instead of one is: First that the fuel in the oil chamber can always be kept under such a high pressure that the introduction of the fuel, even if it contains air and thus is compressible, can take place in the right moment and in the right quantities. The pressure in the air channel into which the fuel is to be introduced, amounts to 60 atmospheres. If, however, the pump which finally causes the introduction should increase the pressure of the fuel from about 0 to 60 atmospheres before the injection had taken place the pump action ought to be very different with different quantities of air in the fuel. Secondly the risk of air from the air channel entering the fuel is greatly lessened, for the quantities of fuel which are to be introduced at last and which are in the oil chamber are under a pressure corresponding to that in the pressure air channel. It is obvious that the injection of the fuel, if considerable quantities of air could enter the fuel, must, on the whole, be very irregular.

I claim:—

1. A device for supplying air and fuel to explosive engines comprising in combination, a plug having a bore delivering to the cylinder of the engine and provided on its intake end with a valve seat, a movable sleeve having a valve for engagement with said seat and communicating with the source of supply of air under pressure and adapted to deliver to said plug, a spindle movable in said sleeve and plug for controlling the supply of compressed air to said sleeve and the supply of oil between said sleeve seat and valve to said plug, a casing surrounding said plug and sleeve and having a chamber back of said sleeve valve, a main pump provided with a passage leading to said chamber, and an auxiliary pump communicating with said chamber, said sleeve having a valve portion closing ingress of fuel from the main pump to said chamber when the sleeve valve is free from engagement with said plug sleeve, substantially as described.

2. The combination with a casing provided with a bore having an annular groove extending there around, said casing further having a chamber communicating with said groove and a second chamber opening into the bore below the groove a fixed sleeve held in said bore and provided with ports opening into said groove, a plug screwed into the lower end of the bore and provided with an opening extending therethrough having a valve seat located therein, said plug further having a valve seat at the upper end, the fixed sleeve being provided with a valve seat at the lower end, a reciprocable sleeve provided with a pair of oppositely disposed valve surfaces adapted to seat on the valve seat at the upper end of the plug and the lower end of the fixed sleeve selectively, said reciprocable sleeve having a groove extending therearound adapted to register with the ports in the fixed sleeve, and a spindle valve movable within the reciprocable sleeve and adapted to seat on the valve seat in the plug.

In testimony whereof I have signed my name to this specification in the presence of two subscribing witnesses.

SVEN WIGELIUS.

Witnesses:
  HEDING MELINDER,
  HARRY ALBIHU.